(12) United States Patent
Song et al.

(10) Patent No.: US 12,142,793 B2
(45) Date of Patent: Nov. 12, 2024

(54) BATTERY PACK AND VEHICLE

(71) Applicant: SVOLT Energy Technology Co., Ltd, Jiangsu (CN)

(72) Inventors: Haiyang Song, Jiangsu (CN); Shengjie Cao, Jiangsu (CN); Sheng Gao, Jiangsu (CN)

(73) Assignee: SVOLT Energy Technology Co., Ltd, Changzhou (CN)

( * ) Notice: Subject to any disclaimer, the term of this patent is extended or adjusted under 35 U.S.C. 154(b) by 799 days.

(21) Appl. No.: 17/296,515

(22) PCT Filed: Nov. 20, 2020

(86) PCT No.: PCT/CN2020/130263
§ 371 (c)(1),
(2) Date: May 24, 2021

(87) PCT Pub. No.: WO2021/098805
PCT Pub. Date: May 27, 2021

(65) Prior Publication Data
US 2022/0131237 A1    Apr. 28, 2022

(30) Foreign Application Priority Data

Nov. 22, 2019 (CN) .......................... 201911155492.0

(51) Int. Cl.
*H01M 50/519* (2021.01)
*H01M 10/42* (2006.01)
(Continued)

(52) U.S. Cl.
CPC ....... *H01M 50/519* (2021.01); *H01M 10/425* (2013.01); *H01M 50/204* (2021.01);
(Continued)

(58) Field of Classification Search
CPC ............. H01M 50/519; H01M 10/425; H01M 50/204; H01M 50/249; H01M 50/296;
(Continued)

(56) References Cited

U.S. PATENT DOCUMENTS

2011/0014501 A1* 1/2011 Scheucher ............ B60L 3/0046
429/7
2011/0293992 A1 12/2011 Hsu et al.
(Continued)

FOREIGN PATENT DOCUMENTS

CN       106299223 A    1/2017
CN       108116231 A    6/2018
(Continued)

OTHER PUBLICATIONS

International Search Report for PCT Application No. PCT/CN2020/130263 mail date Feb. 5, 2021, 4 pages.
(Continued)

*Primary Examiner* — Kaity V Chandler
(74) *Attorney, Agent, or Firm* — Maine Cernota & Curran

(57) ABSTRACT

The present invention discloses a battery pack and a vehicle. The battery pack comprises a plurality of battery cells and electrical connection components. the plurality of battery cells are arranged side by side; the electrical connection components are arranged on the ends of the plurality of battery cells, and have electrode receiving sockets and FPC receiving sockets arranged thereon, wherein the electrode receiving sockets are adapted to be electrically connected with a plurality of electrode posts of the plurality of battery cells, and the FPC receiving sockets are adapted to be electrically connected with a plurality of FPC corresponding to the plurality of battery cells. In the battery pack, the conventional high-voltage copper bars and low-voltage sampling wire harness are integrated into electrical connection
(Continued)

components, and the electrical connection components are arranged on the ends of the battery cells, so as to effectively reduce the clearance between the battery cells, thereby effectively improve the energy density of the battery pack; moreover, the electrical connection components can be mounted automatically, and thereby the assembling time and cost are reduced.

16 Claims, 4 Drawing Sheets

(51) Int. Cl.
*H01M 50/204* (2021.01)
*H01M 50/249* (2021.01)
*H01M 50/296* (2021.01)
*H01M 50/505* (2021.01)
*H01M 50/593* (2021.01)
*H01R 12/77* (2011.01)
*H01R 33/88* (2006.01)

(52) U.S. Cl.
CPC ....... *H01M 50/249* (2021.01); *H01M 50/296* (2021.01); *H01M 50/505* (2021.01); *H01M 50/593* (2021.01); *H01M 2010/4271* (2013.01); *H01M 2220/20* (2013.01); *H01R 12/778* (2013.01); *H01R 33/88* (2013.01)

(58) Field of Classification Search
CPC ............ H01M 50/505; H01M 50/593; H01M 2010/4271; H01M 2220/20; H01M 2200/00; H01M 10/482; H01M 50/507; H01M 50/51; H01M 50/209; H01M 2010/4278; H01M 50/569; H01M 50/588; H01M 50/284; H01M 50/502; H01M 50/24; H01R 12/778; H01R 33/88; Y02E 60/10

See application file for complete search history.

(56) References Cited

U.S. PATENT DOCUMENTS

| | | | |
|---|---|---|---|
| 2012/0019061 | A1 | 1/2012 | Nishihara |
| 2018/0108898 | A1* | 4/2018 | Shoji .................. H01M 10/425 |
| 2019/0296407 | A1* | 9/2019 | Newman ........... H01M 10/6555 |
| 2019/0334216 | A1* | 10/2019 | Kim .................... H01M 50/569 |
| 2021/0098765 | A1* | 4/2021 | Weinberger ......... H01M 50/287 |

FOREIGN PATENT DOCUMENTS

| | | | | |
|---|---|---|---|---|
| CN | 207459047 U | | 6/2018 | |
| CN | 208157502 U | | 11/2018 | |
| CN | 109103405 A | | 12/2018 | |
| CN | 208622846 U | | 3/2019 | |
| CN | 208767409 U | | 4/2019 | |
| CN | 111430650 A | | 1/2020 | |
| CN | 210805858 U | * | 6/2020 | ............ Y02E 60/10 |
| DE | 102010007076 A1 | | 8/2011 | |
| EP | 2784841 A1 | | 10/2014 | |
| KR | 20120003432 A | | 1/2012 | |
| KR | 20200102188 A | * | 8/2020 | .......... H01M 50/502 |
| WO | WO-2020138869 A1 | * | 7/2020 | ........ H01M 10/0413 |

OTHER PUBLICATIONS

European Search Report Search Report for PCT Application No. 20878054.4, Jan. 7, 2022, 8 pages.

* cited by examiner

BATTERY PACK AND VEHICLE

CROSS REFERENCE TO RELATED APPLICATIONS

This application is a national phase application filed under 35 USC § 371 of PCT Application No. PCT/CN2020/130263, with an international filing date of Nov. 20, 2020, which claims priority to Chinese Patent Application No. 201911155492.0, filed on Nov. 22, 2019, entitled "Battery Pack and Vehicle". Each of these applications is herein incorporated by reference in its entirety for all purposes.

FIELD OF THE INVENTION

The present invention relates to the technical field of vehicles, in particular to a battery pack and a vehicle.

BACKGROUND OF THE INVENTION

Spaces for high-voltage copper bars and low-voltage sampling wire harness have to be reserved between the battery cells arranged side by side in conventional battery packs, resulting in severe space occupation in the battery packs. Since the available space in a battery pack is limited, the space for battery cells is decreased; consequently, the energy density and overall charge capacity of the battery pack are low, and there is room for improvement.

SUMMARY OF THE INVENTION

In view of the drawbacks in the prior art, the object of the present invention is to provide a battery pack, which has higher energy density.

To attain the object described above, the present invention employs the following technical scheme:

A battery pack, comprising a plurality of battery cells arranged side by side; electrical connection components arranged on the ends of the plurality of battery cells, having electrode receiving sockets and FPC receiving sockets arranged thereon, wherein the electrode receiving sockets are adapted to be electrically connected with a plurality of electrode posts of the plurality of battery cells, and the FPC receiving sockets are adapted to be electrically connected with a plurality of FPCs corresponding to the plurality of battery cells.

Furthermore, the electrical connection component is further provided with a BDU connecting socket and a BMS connecting socket, a BDU of the battery pack is connected with the BDU connecting socket and electrically connected with the electrode posts of the plurality of battery cells via the electrical connection component, and a BMS of the battery pack is connected with the BMS connecting socket and electrically connected with the plurality of FPCs via the electrical connection component.

Furthermore, the electrical connection component comprises a casing and electrical connection assemblies stacked in the casing. And the casing is connected with the plurality of battery cells.

Furthermore, the electrical connection assembly comprises a connection strap assembly, which comprises a high-voltage connection strap, a front-end connection strap, and a tail-end connection strap, the electrode receiving socket comprises a positive electrode receiving socket and a negative electrode receiving socket, the high-voltage connection strap is electrically connected between the positive electrode receiving socket and the negative electrode receiving socket, one end of the front-end connection strap is electrically connected with the negative electrode receiving socket of the front-most battery cell, the other end of the front-end connection strap is electrically connected with the negative electrode connecting socket in the BDU connecting socket, one end of the tail-end connection strap is electrically connected with the positive electrode receiving socket of the rearmost battery cell, and the other end of the tail-end connection strap is electrically connected with the positive electrode connecting socket in the BDU connecting socket.

Furthermore, the electrical connection assembly further comprises a communication module, wherein one end of the communication module is electrically connected with the FPC receiving socket, and the other end of the communication module is electrically connected with the BMS connecting socket.

Furthermore, the two sides of the connection strap assembly are provided with a first insulating layer respectively, the two sides of the communication module are provided with a second insulating layer respectively, and a conducting shielding layer is coated outside the communication module.

Furthermore, the battery pack further comprises a busbar, which leads the electrode post at one end of the battery cell away from the electrical connection component to the end of the battery cell connected with the electrical connection component.

Furthermore, the busbar is adapted to be arranged across the top surface of the battery cell, the FPC and the busbar are stacked in the vertical direction, and a third insulating layer is provided between the busbar and the FPC.

Furthermore, the BMS is a flexible circuit board BMS having a plurality of protruding connectors, a plurality of BMS connecting sockets are provided, and the plurality of protruding connectors are socket-jointed with the plurality of BMS connecting sockets in one-to-one correspondence.

Compared with the prior art, the battery pack provided in the present invention has the following advantages:

In the battery pack provided by the present invention, the conventional high-voltage copper bars and low-voltage sampling wire harness are integrated into electrical connection components, and the electrical connection components are arranged on the ends of the battery cells, so as to effectively reduce the clearance between the battery cells, thereby effectively improve the energy density of the battery pack; moreover, the electrical connection components can be mounted automatically, and thereby the assembling time and cost are reduced.

Another object of the present invention is to provide a vehicle, which comprises the above battery pack that has higher energy density.

BRIEF DESCRIPTION OF DRAWINGS

The accompanying drawings, which constitute a part of the present invention, are used to provide a further understanding of the present invention. The illustrative embodiments of the present invention and their description are used to explain the present invention, but don't constitute any undue limitation to the present invention. In the figures.

REFERENCE NUMBERS

1—battery cell, 2—electrical connection component, 21—electrode receiving socket, 22—FPC receiving socket, 3—FPC, 23—BDU connecting socket, 24—BMS connecting socket, 25—casing, 261—high-voltage connection strap, 262—front-end connection strap, 263—tail-end connection strap, 211—positive electrode receiving socket, 212—negative electrode receiving socket, 231—negative electrode connecting socket, 232—positive electrode connecting socket, 264—communication module, 4—first insulating layer, 5—second insulating layer, 6—conducting shielding layer, 7—busbar, 8—third insulating layer, 9—BMS, 91—protruding connector, 251—positioning pole, 252—mounting point, 10—BDU.

DETAILED DESCRIPTION OF THE EMBODIMENTS

It is noted that the embodiments and the features in the embodiments in the present invention can be combined freely, provided that there is no confliction among them.

Hereunder the battery pack according to the embodiments of the present invention will be described with reference to FIGS. 1-6.

The battery pack according to the embodiments of the present invention may comprise a plurality of battery cells 1 and electrical connection components 2.

Figure 1:
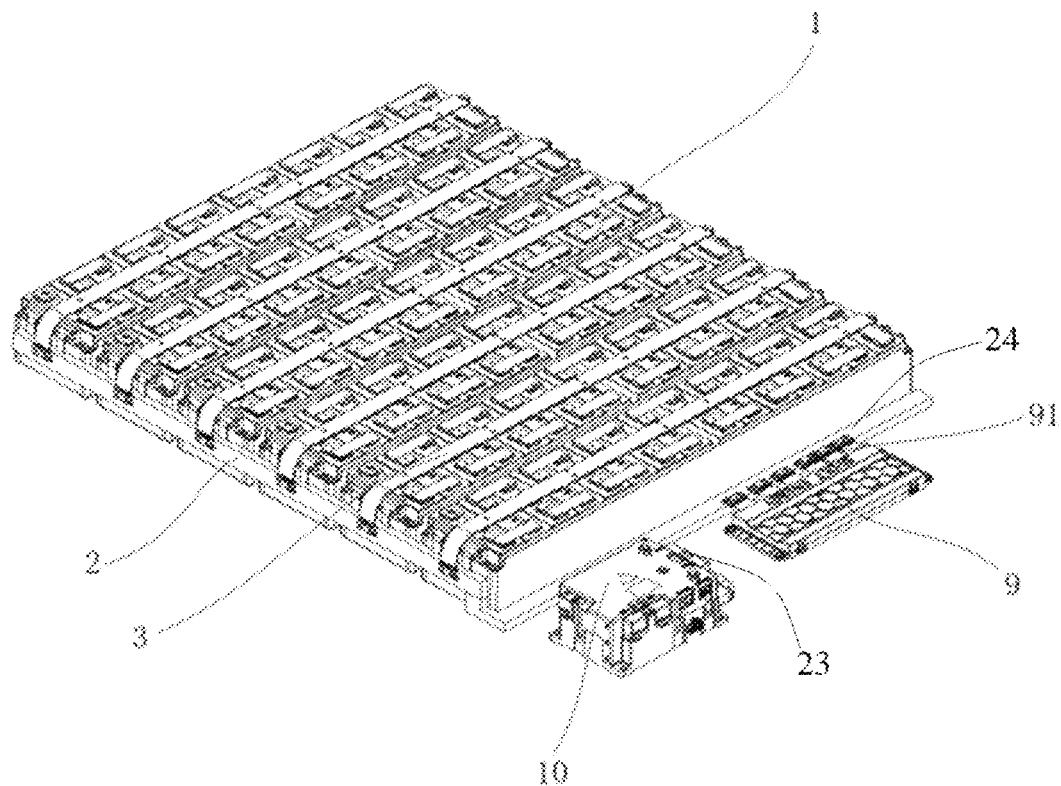
FIG. 1 is a partial schematic structural diagram of the battery pack according to the embodiments of the present invention.
Figure 2:
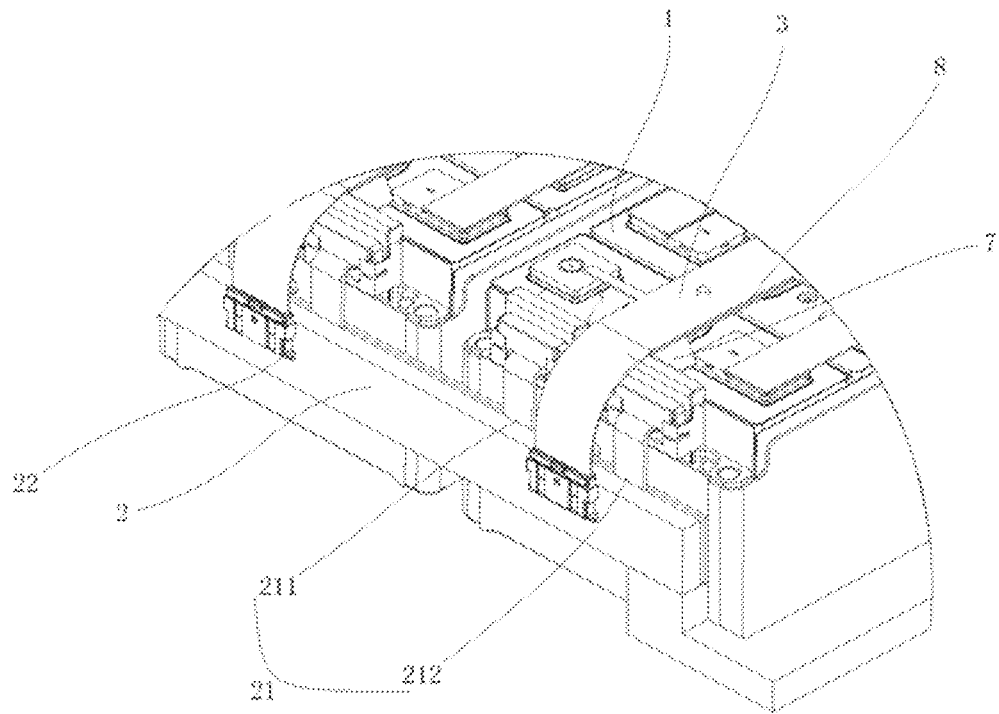
FIG. 2 is a partially enlarged view of the structure in FIG. 1.
Figure 3:
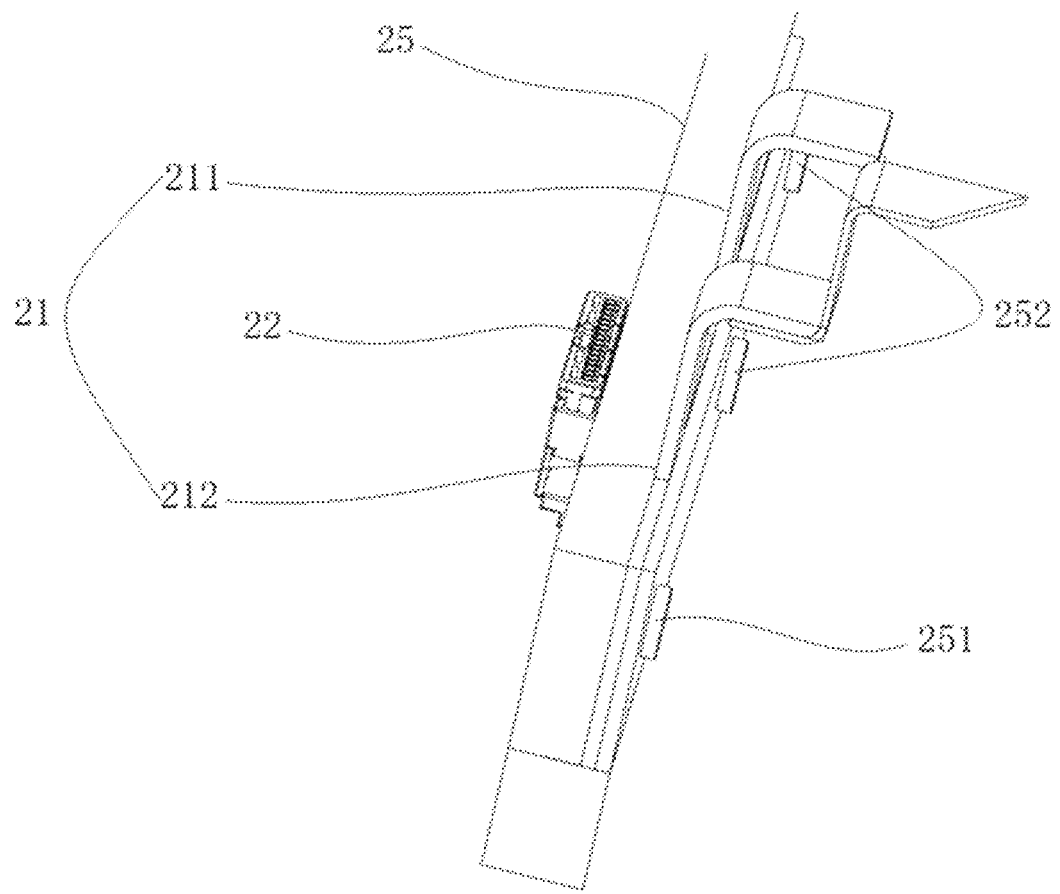
FIG. 3 is a partial structural diagram of the electrical connection component according to the embodiments of the present invention.

As shown in FIGS. 1-3, the plurality of battery cells 1 are arranged side by side. The plurality of battery cells 1 may be arranged side by side closely in the length direction or width direction of the battery pack. Spaces for high-voltage copper bars and low-voltage sampling wire harness have to be reserved between the battery cells arranged side by side in conventional battery packs, resulting in severe space occupation in the battery packs. Since the available space in a battery pack is limited, the space for battery cells is decreased; consequently, the energy density and overall charge capacity of the battery pack are low.

In order to solve the above problems, in the embodiments of the present invention, electrical connection components 2 are provided in the battery pack and arranged on the ends of a plurality of battery cells 1, so as to connect the battery cells 1 closely and avoid excessive space occupation; wherein, the electrical connection components 2 have electrode receiving sockets 21 and FPC (flexible circuit board) receiving sockets 22, the electrode receiving sockets 21 are adapted to be electrically connected with a plurality of electrode posts of the plurality of battery cells 1 respectively so as to connect the plurality of battery cells 1 in series, and the FPC receiving sockets 22 are adapted to be electrically connected with a plurality of FPCs 3 corresponding to the plurality of battery cells 1 so as to realize transmission of the acquisition signals of the FPCs 3. That is to say, the electrical connection component 2 integrates the functions of the high-voltage copper bar and low-voltage sampling wire harness in a conventional battery pack; in other words, the electrical connection component 2 in the present invention integrates the high-voltage copper bar and low-voltage sampling wire harness in a conventional battery pack to avoid excessive space occupation in the battery pack.

Thus, the clearance reserved between the battery cells 1 during the arrangement of the battery cells 1 can be effective reduced, so that more battery cells 1 can be arranged, and thereby the energy density of the battery pack can be improved effectively.

The electrode posts of the battery cell 1 may be socket-jointed with the electrode receiving sockets 21 to facilitate installation, and the socket connector on the end of the FPC3 is adapted to be socket-jointed with the FPC receiving sockets 22 to facilitate installation. The "electrode post" described above doesn't represent a post structure; alternatively, it may be a plate structure. Therefore, the electrode post should not be comprehended as a limitation to the structural shape.

In addition, in view that the high-voltage copper bar and low-voltage sampling wire harness in a conventional battery pack are arranged in a dispersed manner, usually the operator has to take a long time to connect the high-voltage copper bars between the battery cells and arrange the low-voltage sampling wire harness according to the layout of the low-voltage sampling wire harness in the assembling process. Therefore, it is impossible to carry out assembling automatically.

In contrast, in the embodiments of the present invention, by integrating the conventional high-voltage copper bars and low-voltage sampling wire harness into electrical connection components 2, the electrical connection components 2 may be mounted on the battery cells 1 quickly and automatically by means of a machine, so as to effectively save the assembling time of the battery pack and save the installation cost.

In the battery pack according to the embodiments of the present invention, the conventional high-voltage copper bars and low-voltage sampling wire harness are integrated into electrical connection components 2, and the electrical connection components 2 are arranged on the ends of the battery cells 1, so as to effectively reduce the clearance between the battery cells 1, thereby effectively improve the energy density of the battery pack; moreover, the electrical connection components 2 can be mounted automatically, and thereby the assembling time and cost are reduced.

In the embodiment shown in FIGS. 1-4, the electrical connection component 2 further has a BDU (Battery Disconnect Unit) connecting socket 23 and a BMS (Battery Management System) connecting socket 24, wherein a BDU 10 of the battery pack is adapted to be electrically connected with the BDU connecting socket 23 and electrically connected with the electrode posts of the plurality of battery cells 1 via the electrical connection component 2. Thus, the electric power of the plurality of battery cells 1 can be transferred via the electrical connection components 2 to the BDU 10 and then transferred out of the battery pack via the BDU 10, so that the BDU 10 can quickly cut off the electric power output to ensure the safety of the battery pack.

Furthermore, the BMS 9 of the battery pack is adapted to be connected with the BMS connecting socket 24 and electrically connected with the plurality of FPCs 3 via the electrical connection components 2, so that the BMS 9 can rationally regulate the battery pack according to the information of the battery cells 1 acquired by the FPCs 3, thereby avoid overcharge and over-discharge of the battery pack and ensure the safety of the battery pack.

Figure 4:
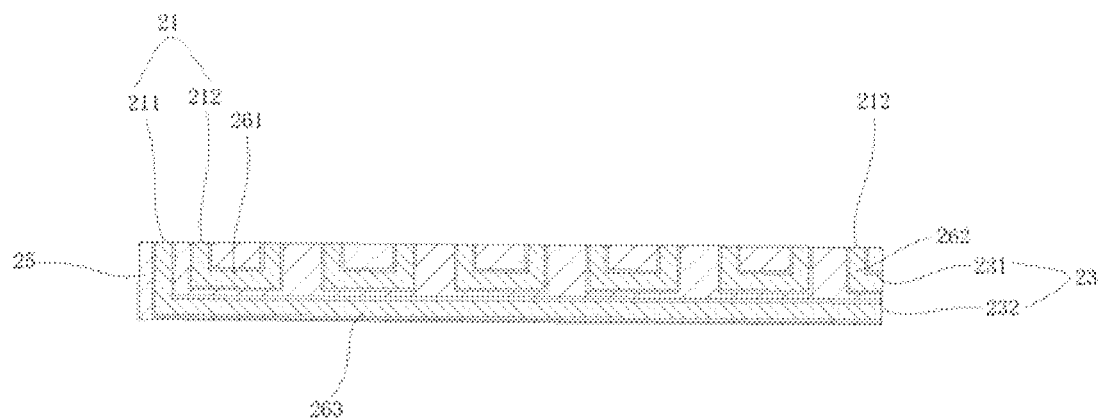
FIG. 4 is a cross sectional view of the electrical connection component according to the embodiments of the present invention.
Figure 5:
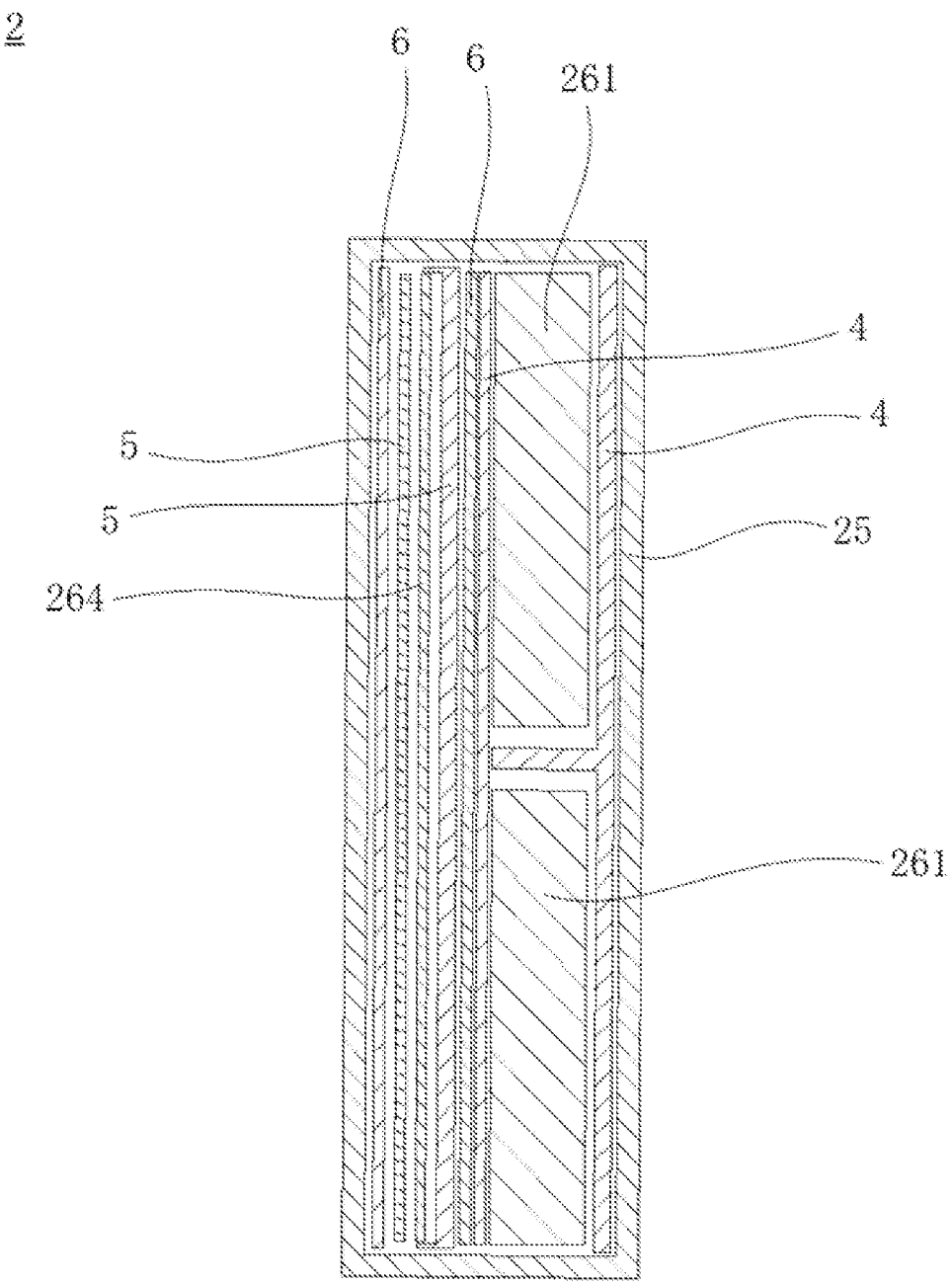
FIG. 5 is a vertical sectional view of the electrical connection component according to the embodiments of the present invention.

In the embodiment shown in FIGS. 4 and 5, the electrical connection component 2 comprises a casing 25 and electrical connection assemblies stacked in the casing 25, wherein the electrical connection assemblies are equivalent to the high-voltage copper bars and low-voltage sampling wire harness in a conventional battery pack, and are stacked in the casing 25 to reduce space occupation effectively, thereby the casing 25 can be smaller, the layout space of the battery cell 1 is not occupied excessively, and the energy density of the battery pack is improved.

Moreover, the casing 25 can effectively protect the electrical connection assemblies inside it, effectively avoid a short circuit phenomenon incurred by the wearing of the electrical connection assemblies caused by bolts, soldering beads, soldering seams, and parts with metal edges in the battery pack, and thereby decrease the risk of short circuit in the battery pack and effectively improve the safety of the battery pack.

Preferably, the casing 25 may be integrally injection-molded, and can further avoid the wearing of the electrical connection assemblies caused by the risky parts and components in the battery pack effectively, avoid the short circuit phenomenon and ensure the safety of the battery pack, when compared with the protection provided by fabric-based adhesive tape or corrugated tubes for conventional low-voltage sampling wire harness.

Furthermore, as shown in FIGS. 1-3, the casing 25 is connected on the plurality of battery cells 1. Specifically, positioning poles 251 and mounting points 252 are arranged on the inner side walls of the casing 25, the casing 25 can be positioned and fitted with the end plates of the battery cells 1 via the positioning poles 251, the entire electrical connection component 2 can be mounted on the end plate of the battery cell 1 via the mounting points 252, and can be fixed by bolts or by bonding. Thus, it is easier to carry out automatic assembling.

Figure 6:
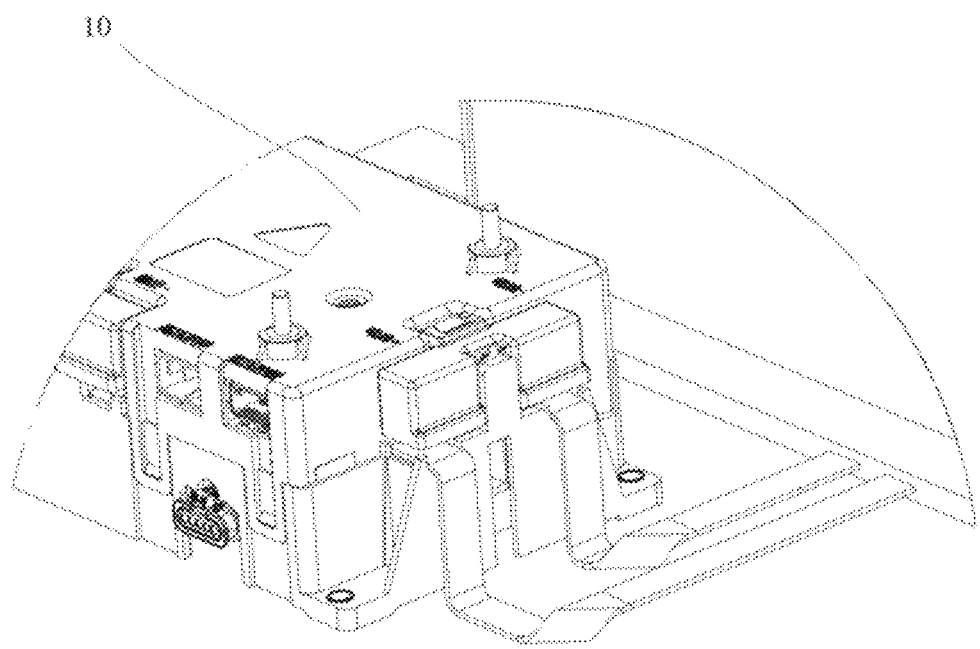
FIG. 6 is a partially enlarged view of the structure in FIG. 1.

As shown in FIGS. 4-6, the electrical connection assembly comprises a connection strap assembly, which comprises a high-voltage connection strap 261, a front-end connection strap 262, and a tail-end connection strap 263, wherein all of the high-voltage connection strap 261, the front-end connection strap 262 and the tail-end connection strap 263 may be conducting strips (equivalent to the high-voltage copper bars in a conventional battery pack), the electrode receiving socket 21 comprises a positive electrode receiving socket 211 and a negative electrode receiving socket 212, the positive electrode receiving socket 211 is adapted to be socket-jointed with the positive electrode post of the battery cell 1 to form an electrical connection, and the negative electrode receiving socket 212 is adapted to be socket-jointed with the negative electrode post of the battery cell 1 to form an electrical connection, wherein the high-voltage connection strap 261 is adapted to be electrically connected between the positive electrode receiving socket 211 of a battery cell 1 and the negative electrode receiving socket 212 of an adjacent battery cell 1, one end of the front-end connection strap 262 is electrically connected with the negative electrode receiving socket 212 of the front-most battery cell 1, and the other end of the front-end connection strap 262 is electrically connected with the negative electrode connecting socket 231 in the BDU connecting socket 23 and thereby is electrically connected with the negative electrode terminal of the BDU 10, one end of the tail-end connection strap 263 is electrically connected with the positive electrode receiving socket 211 of the rearmost battery cell 1, and the other end of tail-end connection strap 263 is electrically connected with the positive electrode connecting socket 232 in the BDU connecting socket 23 and thereby is electrically connected with the positive electrode terminal of the BDU 10, so that the plurality of battery cells 1 are connected in series between the BDUs 10, and thereby the electric power output from the battery pack is realized.

Furthermore, as shown in FIGS. 4 and 5, the electrical connection assembly further comprises a communication module 264 (equivalent to the low-voltage sampling wire harness in a conventional battery pack), wherein one end of the communication module 264 is electrically connected with the FPC receiving socket 22, and the other end of the communication module 264 is electrically connected with the BMS connecting socket 24 and thereby electrically connected with the BMS 9, so that the BMS 9 can acquire the information of the battery cells 1.

As shown in FIG. 5, the two sides of the connection strap assembly are provided with a first insulating layer 4 respectively to realize insulation of the connection strap assembly, the two sides of the communication module 264 are provided with a second insulating layer 5 to realize the insulation of the communication module 264, so as to effectively avoid forming any electrical connection between the connection strap assembly and the communication module 264, and thereby ensure the safety of the battery pack.

The connection strap assembly may be made of a conducting material such as copper, aluminum, or silver, etc., while the first insulating layer 4 and the second insulating layer 5 may be made of an insulating material, such as polyimide (PI), polyethylene (PE), or polyethylene glycol terephthalate (PET), etc.

Furthermore, a conducting shielding layer 6 may be coated outside the communication module 264, and the conducting shielding layer 6 may be arranged at the outer side of the second insulating layer 5. Alternatively, a conducting shielding layer 6 may be coated outside the connection strap assembly, and the conducting shielding layer 6 may be arranged at the outer side of the first insulating layer 4. The conducting shielding layer 6 may be made of a conducting metal material such as copper, aluminum, nickel, gold, or sliver, or may be made of an alloy material or composite material, and can effectively prevent the interference of the connection strap assembly to the signals transmitted in the communication module 264, ensure isolation between the communication module 264 and the connection strap assembly, and thereby further ensure the safety of the battery pack.

As shown in FIGS. 1 and 2, the battery pack further comprises a busbar 7, which leads the electrode post at one end of the battery cell 1 away from the electrical connection component 2 to the end of the battery cell connected with the electrical connection component 2; in addition, the busbar 7 is adapted to be arranged across the top surface of the battery cell 1; the FPC 3 and the busbar 7 are stacked in the vertical direction, and a third insulating layer 8 is provided between the busbar 7 and the FPC 3. Specifically, the negative electrode post at the other end of the battery cell 1 is led to the side of the positive electrode post by means of a long busbar 7, and a third insulating layer 8 made of an insulating material (e.g., PE/PI) is arranged on the busbar 7 at an appropriate position, an FPC 3 is arranged above the third insulating layer 8 to acquire and transmit the voltage and temperature information of the battery cell 1, and the information is collected at the electrical connection component 2.

As shown in FIG. 1, the BMS 9 is a flexible circuit board BMS 9, which is to say, the BMS 9 employs a flexible circuit board to replace the conventional printed circuit board (PCB); the parts and components in the BMS 9 are fixed on the flexible circuit board; in addition, the flexible circuit board BMS 9 has a plurality of protruding connectors 91, a plurality of BMS connecting sockets 24 are provided, and the plurality of protruding connectors 91 are socket-jointed with the plurality of BMS connecting sockets 24 in one-to-one correspondence; that is to say, the protruding connectors 91 that can be directly connected with the flexible circuit board are employed to replace the original terminal connectors that have to be fixed, and the protruding connectors 91 are connected to the BMS connecting sockets 24 for transmission of low-voltage signals. By utilizing protruding connectors 91 for socket-jointing, the reserved operating space required for butt-jointing of the wire harnesses can be reduced, and thereby the energy density of the battery pack can be effectively improved.

Alternatively, a plurality of protruding connectors 91 may communicate with one BMS connecting socket 24 correspondingly, or one protruding connector 91 may communicate with a plurality of BMS connecting sockets 24 correspondingly, or one protruding connector 91 may communicate with one BMS connecting socket 24 correspondingly. The form of communication may be determined reasonably according to the specific layout in the battery pack.

The BDU 10 and the BMS 9 may be arranged at the same side of the battery cells 1 to reduce the footprint, and thereby effectively improve the energy density of the battery pack.

In an embodiment in another aspect of the present invention, the present invention provides a vehicle, which comprises the battery pack described in the above embodiment. Other structures of the vehicle, such as transmission, braking system, and steering system, etc., belong to the prior art and are well known to those skilled in the art. Therefore, those structures of the vehicle are not detailed here.

While the present invention is described above in some preferred embodiments, the present invention is not limited to those preferred embodiments. Any modification, equivalent replacement, and improvement made without departing from the spirit and principle of the present invention shall be deemed as falling into the scope of protection of the present invention.

The invention claimed is:

1. A battery pack, comprising:
a plurality of battery cells arranged side by side;
electrical connection components arranged on the ends of the plurality of battery cells, having electrode receiving sockets and FPC receiving sockets arranged thereon, the electrode receiving sockets are adapted to be electrically connected with a plurality of electrode posts of the plurality of battery cells, and the FPC receiving sockets are adapted to be electrically connected with a plurality of FPCs corresponding to the plurality of battery cells; and wherein the electrical connection assembly comprises a connection strap assembly, which comprises a high-voltage connection strap, a front-end connection strap, and a tail-end connection strap, the electrode receiving socket comprises a positive electrode receiving socket and a negative electrode receiving socket, the high-voltage connection strap is electrically connected between the positive electrode receiving socket and the negative electrode receiving socket, one end of the front-end connection strap is electrically connected with the negative electrode connecting socket of the front-most battery cell, the other end of the front-end connection strap is electrically connected with the negative electrode connecting socket in the BDU connecting socket, one end of the tail-end connection strap is electrically connected with the positive electrode receiving socket of the rearmost battery cell, and the other end of the tail-end connection strap is electrically connected with the positive electrode connecting socket in the BDU connecting socket.

2. The battery pack according to claim 1, wherein the electrical connection component is further provided with a BDU connecting socket and a BMS connecting socket, a BDU of the battery pack is connected with the BDU connecting socket and electrically connected with the electrode posts of the plurality of battery cells via the electrical connection component, and a BMS of the battery pack is connected with the BMS connecting socket and electrically connected with the plurality of FPCs via the electrical connection component.

3. The battery pack according to claim 2, wherein the electrical connection component comprises a casing and electrical connection assemblies stacked in the casing, and the casing is connected with the plurality of battery cells.

4. The battery pack according to claim 2, wherein the BMS is a flexible circuit board BMS having a plurality of protruding connectors, a plurality of BMS connecting sockets are provided, and the plurality of protruding connectors are socket-jointed with the plurality of BMS connecting sockets in one-to-one correspondence.

5. The battery pack according to claim 1, wherein the electrical connection assembly further comprises a communication module, wherein one end of the communication module is electrically connected with the FPC receiving socket, and the other end of the communication module is electrically connected with the BMS connecting socket.

6. The battery pack according to claim 5, wherein the two sides of the connection strap assembly are provided with a first insulating layer respectively, the two sides of the communication module are provided with a second insulating layer respectively, and a conducting shielding layer is coated outside the communication module.

7. The battery pack according to claim 6, further comprising a busbar, which leads the electrode post at one end of the battery cell away from the electrical connection component to the end of the battery cell connected with the electrical connection component.

8. The battery pack according to claim 7, wherein the busbar is adapted to be arranged across the top surface of the battery cell, the FPC and the busbar are stacked in the vertical direction, and a third insulating layer is provided between the busbar and the FPC.

9. A vehicle, comprising a battery pack, comprising:
a plurality of battery cells arranged side by side;
electrical connection components arranged on the ends of the plurality of battery cells, having electrode receiving sockets and FPC receiving sockets arranged thereon, the electrode receiving sockets are adapted to be electrically connected with a plurality of electrode posts of the plurality of battery cells, and the FPC receiving sockets are adapted to be electrically connected with a plurality of FPCs corresponding to the plurality of battery cells; and wherein the electrical connection assembly comprises a connection strap assembly, which comprises a high-voltage connection strap, a front-end connection strap, and a tail-end connection strap, the electrode receiving socket comprises a positive electrode receiving socket and a negative electrode receiving socket, the high-voltage connection strap is electrically connected between the positive electrode receiving socket and the negative electrode receiving socket, one end of the front-end connection strap is electrically connected with the negative electrode connecting socket of the front-most battery cell, the other end of the front-end connection strap is electrically connected with the negative electrode connecting socket in the BDU connecting socket, one end of the tail-end connection strap is electrically connected with the positive electrode receiving socket of the rearmost battery cell, and the other end of the tail-end connection strap is electrically connected with the positive electrode connecting socket in the BDU connecting socket.

10. The vehicle according to claim 9, wherein the electrical connection component is further provided with a BDU connecting socket and a BMS connecting socket, a BDU of the battery pack is connected with the BDU connecting socket and electrically connected with the electrode posts of the plurality of battery cells via the electrical connection component, and a BMS of the battery pack is connected with the BMS connecting socket and electrically connected with the plurality of FPCs via the electrical connection component.

11. The vehicle according to claim 10, wherein the electrical connection component comprises a casing and electrical connection assemblies stacked in the casing, and the casing is connected with the plurality of battery cells.

12. The vehicle according to claim 10, wherein the BMS is a flexible circuit board BMS having a plurality of protruding connectors, a plurality of BMS connecting sockets are provided, and the plurality of protruding connectors are socket-jointed with the plurality of BMS connecting sockets in one-to-one correspondence.

13. The vehicle according to claim 9, wherein the electrical connection assembly further comprises a communication module, wherein one end of the communication module is electrically connected with the FPC receiving socket, and the other end of the communication module is electrically connected with the BMS connecting socket.

14. The vehicle according to claim 13, wherein the two sides of the connection strap assembly are provided with a first insulating layer respectively, the two sides of the communication module are provided with a second insulating layer respectively, and a conducting shielding layer is coated outside the communication module.

15. The vehicle according to claim 14, further comprising a busbar, which leads the electrode post at one end of the battery cell away from the electrical connection component to the end of the battery cell connected with the electrical connection component.

16. The vehicle according to claim 15, wherein the busbar is adapted to be arranged across the top surface of the battery cell, the FPC and the busbar are stacked in the vertical direction, and a third insulating layer (8) is provided between the busbar and the FPC.

* * * * *